W. S. GOLDWIRE & J. F. PATTON.
CAMERA.
APPLICATION FILED MAY 25, 1915.

1,224,531.

Patented May 1, 1917.

Inventors
W. S. Goldwire.
J. F. Patton.

UNITED STATES PATENT OFFICE.

WILLIAM S. GOLDWIRE AND JOHN F. PATTON, OF MACON, GEORGIA, ASSIGNORS OF ONE-THIRD TO WADE R. BEDINGFIELD, OF MACON, GEORGIA.

CAMERA.

1,224,531.      Specification of Letters Patent.      Patented May 1, 1917.

Application filed May 25, 1915. Serial No. 30,358.

*To all whom it may concern:*

Be it known that we, WILLIAM S. GOLDWIRE and JOHN F. PATTON, citizens of the United States, residing at Macon, in the county of Bibb and State of Georgia, have invented certain new and useful Improvements in Cameras; and we do hereby declare the following to be a full, clear, and exact description of the invention, such as will enable others skilled in the art to which it appertains to make and use the same.

This invention relates to cameras and more particularly to an operating mechanism for automatically winding the film in film cameras.

The invention has for its object to provide simple and efficient film operating mechanism for cameras, including novel and efficient means for controlling the operating mechanism.

Another object is the provision of an efficient automatic stop for insuring proper movement of the film within the camera and also means for automatically stopping the operating mechanism when the film is stopped.

With these and other objects in view, the invention consists in the novel construction, arrangement and formation of parts as will be hereinafter specifically described, claimed and illustrated in the accompanying drawing, in which:

Figure 1:
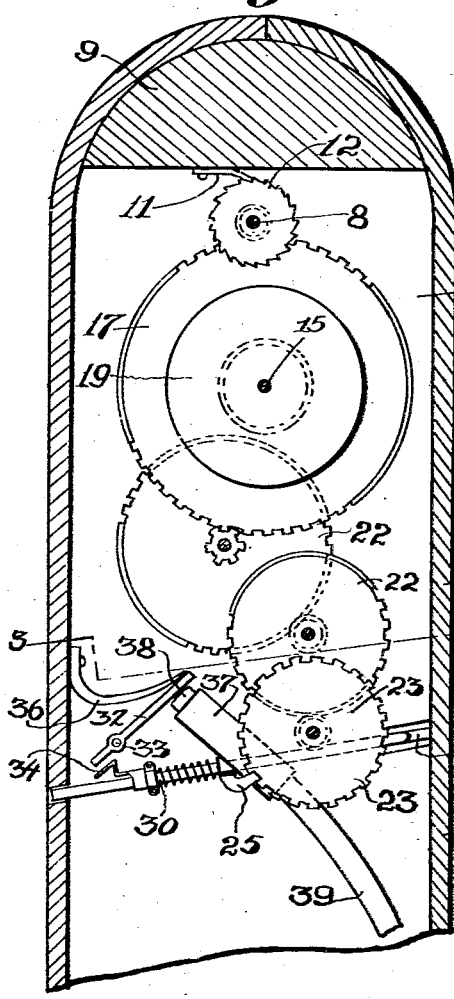
Figure 1 represents a fragmental longitudinal sectional view through a camera, in the plane of the section line 1—1 of Fig. 2, illustrating the improved film actuating mechanism.
Figure 2:
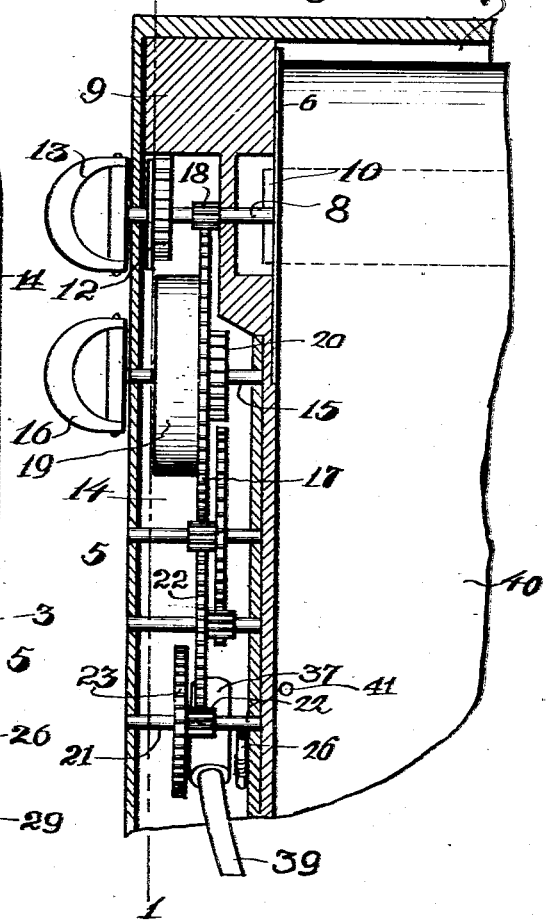
Fig. 2 represents a fragmental sectional view through the camera, taken at right angles to Fig. 1.
Figure 3:
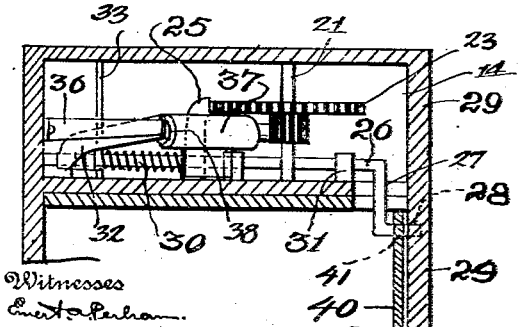
Fig. 3 represents a fragmental transverse sectional view through the camera in the plane of the section line 3—3 of Fig. 1.

Referring to the drawing in detail, wherein similar reference numerals designate corresponding parts throughout the several views, the numeral 5 indicates generally the body or case of a camera of the usual or any preferred construction having the usual film spool receiving chambers in the ends thereof, one of which is adapted to receive the film receiving spool 6. The usual stud (not shown) is provided in one end of the film receiving chamber 7 and a spool turning shaft 8 is rotatable and slidable longitudinally in one side wall 9 of the body 5 and is provided with laterally projecting wings 10 adapted to engage in the diametrical slot ordinarily formed in the end of the spool. The shaft 8 is locked against rotational movement in a direction to unwind the film from the spool by a pawl 11 engaging a ratchet wheel 12, and the outer extremity of the shaft is provided with a pivoted handle 13, whereby the shaft and spool 6 associated therewith may be rotated so as to wind the film in the usual manner.

The improved film actuating mechanism is mounted in a suitable recess 14 formed in the side wall 9 of the camera body adjacent the shaft 8 and includes a main shaft 15 extending exteriorly of the side wall 9 and provided with a pivoted handle 16.

A gear wheel 17 is keyed upon the main or winding shaft 15 and coöperates with a relatively small gear wheel 18 keyed upon the shaft 8, whereby rotary motion from the shaft 15 is imparted to the film spool receiving shaft 8. A spring and ratchet mechanism 19 and 20 is arranged upon the shaft 15 and the spring is designed to be wound by rotary motion imparted to the shaft 15.

The winding shaft 15 is connected with a shaft 21 rotatably mounted in the recess 14 at the end opposite the shaft 8 by a train of gears 22. A relatively larger gear wheel 23 is keyed upon the shaft 21 at the end of the train of gears 22 and is adapted to receive between the teeth thereof a laterally projecting arm 25 of a slide rod 26, having one end 27 offset and adapted to engage within a recess 28 formed in the rear wall or back 29 of the camera. The slide rod 26 is normally retained in rearwardly extended position with the offset end thereof in the recess 28 by the tension of a spring 30 arranged between the arm 25 and one of the pair of bearings 31 for the slide rod. A lever 32 is pivotally secured at 33 in the recess 14 and one end thereof is adapted to engage an angular spring catch 34 secured to the slide rod 26 and so arranged as to be depressed or moved inwardly toward the slide rod during movement of the lever 32 in one direction. The catch 34 is so constructed as to define an angular shoulder behind which the adjacent extremity of the lever 32 is adapted to engage so as to move the slide rod 26 forwardly under the influence of a spring 36 secured in the recess 14 and engaged with the end of the lever 32 opposite the slide rod. A cylinder 37 is mounted in the recess 14 and contains a slidable piston 38 adapted to be moved outwardly into engagement with one end of the lever 32 to swing the latter upon its pivotal axis 33 so as to engage the end of said lever adjacent the slide rod 26 behind the shoulder of the spring catch 34, and thus, when pressure upon the piston 38 is released the end of the lever 32 is engaged with the shoulder of the catch 34 and the slide rod 26 is moved longitudinally and retracted from the recess 28 under the influence of the spring 36 which swings the lever 32 to its normal position, as illustrated in Fig. 1. A suitable tube 39 is connected with one end of the cylinder 37 and is provided at its opposite extremity with a bulb, whereby pneumatic pressure may be applied to the piston 38 to actuate the latter.

The film and film backing 40 are formed with registering apertures 41 spaced a distance apart equal to the length of the exposure opening of the camera and are adapted to be successively moved into registration with the recess 28 in the camera back so as to receive the slide rod 26 when the latter is moved rearwardly of the camera under the influence of the spring 30.

In use, the film 40 is arranged in the camera in the ordinary manner, and the spring 19 is wound by means of the handle 16. When the film has been properly threaded upon the receiving spool 6 and the camera back placed in its proper position to exclude light from the interior of the camera, the bulb (not shown) is compressed, thereby forcing the piston 38 outwardly against the adjacent extremity of the lever 32, swinging the latter upon its pivotal axis 33 and engaging the end of said lever opposite the piston engaging end thereof behind the shoulder of the spring catch 34. When the pressure upon the bulb is released the lever 32 is permitted to swing back to normal position under the influence of the spring 36 moving therewith the slide rod 26 against the tension of the spring 30 and thus disengaging the end of the slide rod from the inner surface of the film 40 and simultaneously disengaging the arm 25 of the slide rod from the teeth of the gear wheel or pinion 23. The gear wheel 23 being released the tension of the spring 19 rotates the relatively large gear wheel 17 and the gear wheel 18 and shaft 8, thus rotating the film receiving spool 6 and winding the film thereon. As the first section of the film for exposure moves behind the offset end 27 of the slide rod the latter is forced rearwardly under the influence of the spring 30 and engaged through the aperture 41 and within the recess 28, thus locking the film in position and simultaneously locking the spring operated mechanism for the film receiving spool against operation by engaging the arm 25 with the teeth of the pinion 23. After the exposure of the first film section the bulb (not shown) is actuated thus forcing the piston 38 outwardly against the adjacent extremity of the pivoted lever 32 and repeating the operation hereinbefore described, thus simultaneously releasing the film 40 and the film spool operating mechanism.

What we claim is:

1. In a camera, a body, a spool supporting and rotating shaft rotatably mounted in said body, spring means normally tending to rotate said shaft, a spring pressed slide rod normally engaged with a film supported in said camera body for stopping the movement of the film, means carried by and operable when said slide rod is in film stopping position to lock said spring means against operation, and manually operated means operable during its return movement to automatically actuate said slide rod to release the film.

2. In a camera, a body, a spool supporting and rotating shaft rotatably mounted in said body, spring means for rotating said shaft, a spring pressed slide rod normally engaged with a film supported in said body to stop the movement of the film, a spring pressed lever pivotally secured in said body, manually operable means for moving the said lever against the spring means associated therewith, and a spring catch carried by said slide rod adapted to be engaged by one end of said lever whereby the longitudinal movement of said slide rod and the release of the film is thereby effected.

3. In a camera, a body, a spool supporting shaft rotatably mounted in said body, spring means for rotating said shaft, a spring pressed slide rod normally engaged with a film supported in said body, an arm carried by said slide rod adapted, when said slide rod is engaged with the film, to engage said spring means to lock the latter against operation, a lever pivotally mounted in said body, a spring catch carried by said slide rod adapted to be engaged by said lever to effect the longitudinal movement of the slide rod to release the film, spring means for returning said lever to initial position, and manually operable means for setting said lever and engaging one end thereof with said spring catch.

In testimony whereof we affix our signatures in presence of two witnesses.

WILLIAM S. GOLDWIRE.
JOHN F. PATTON.

Witnesses:
J. P. BURNETT,
J. M. MASSEY.